May 10, 1949. L. W. GOTTSCHALCK 2,469,961
KNIT GOODS AND THE LIKE, AND METHODS
Filed April 17, 1947
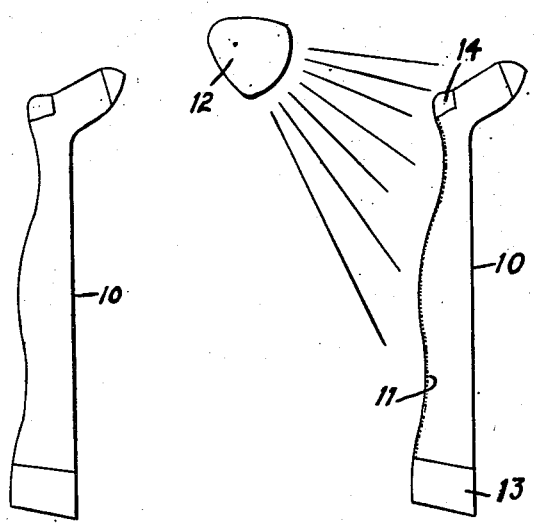
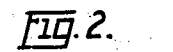
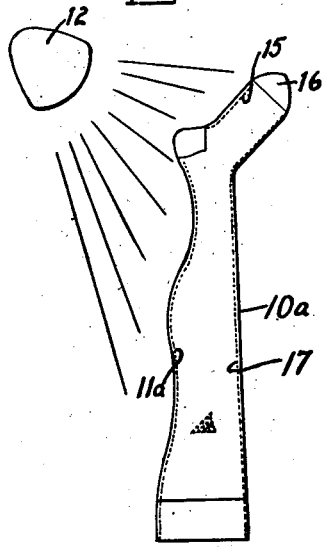
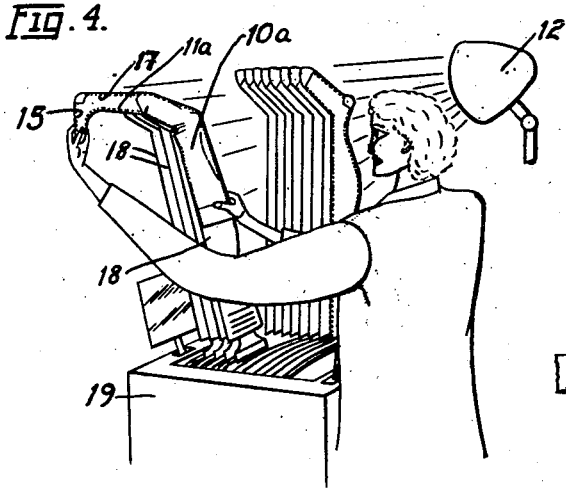
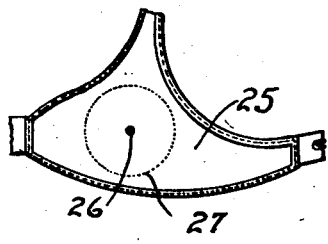
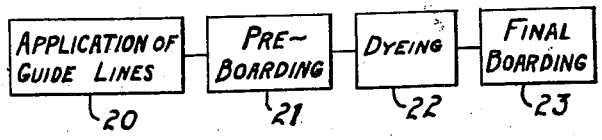
INVENTOR
LAWRENCE W. GOTTSCHALCK
BY
Robert Irving Williams
ATTORNEY Patented May 10, 1949

2,469,961

UNITED STATES PATENT OFFICE 2,469,961

KNIT GOODS AND THE LIKE, AND METHODS

Lawrence W. Gottschalck, Riverdale, N. Y.

Application April 17, 1947, Serial No. 742,118

11 Claims. (Cl. 2—239)

This invention relates to knit goods and various apparel fabrics and other textile fabrics and to methods utilizable in shaping the same, and more particularly has to do with hosiery, brassières, girdles, underclothing and other articles of apparel, shaped curtains and the like, wherein accuracy of shape is highly important, and to methods of shaping such articles from thermoplastic materials.

In the production of seamless hosiery and other shaped articles of apparel from nylon and other thermoplastics it is frequently customary to first knit the same in rough approximation of the desired shape and then to more accurately shape the same under heat on molds or forms. In the manufacture of nylon stockings, the knitted stockings are commonly subjected to two such operations, known as "preboarding" and "final boarding," with an intermediate operation to dye or otherwise wash the fabric. In such procedures it is highly important that the knit goods be accurately positioned on the form. This is also an important requirement in various similar forming and molding operations, as, for example, in the shaping of nylon brassières and other feminine undergarments which have been knitted or woven of nylon or other thermoplastic yarns, or indeed of other articles knitted, woven, or felted from thermoplastic yarns or molded from thermoplastic sheet material. The thermoplastic qualities of fabrics of nylon and other thermoplastic synthetic yarns now in use or still to be introduced will result in many short cuts in tailoring procedures wherein molding will replace tailoring but in these short cuts accuracy of molding must be at least equal to the accuracy of the replaced tailoring. These considerations apply both in original molding operations and in molding operations which may be necessary after initial molding, dyeing, washing, tailoring, or use.

In so far as ladies' hosiery is concerned, there are two general types—full fashioned and circular or seamless. Proper shaping is a simple matter in the case of full fashioned hosiery, for the back leg seam furnishes a ready guide for the proper placement of the stocking, without twist or spiral throughout its length, on both the preboarding and final boarding forms. Much greater difficulties in proper shaping occur in the case of seamless hosiery, however. An attempt at the solution of the difficulties involved in preboarding seamless nylon stockings is described in Patent No. 2,388,648 issued to Harry N. Sheppard. In this patent it is proposed for accuracy of preboarding to mark the stocking where the seam ordinarily would occur with a fugitive dye, so that the final stocking will bear no trace of this vertical color line or marking which disappears in the dyeing operation. While accuracy of preboarding can be assured in this way, much of the accurate contour and effective sales appeal of the stocking can be lost by careless final boarding after the fugitive dye line has disappeared as the result of the dyeing operation. Moreover, the procedure of this patent is of no advantage in any remolding or reshaping operations after the guiding color line has been lost in dyeing, whereas nylon and like fabrics are eminently adapted for such operations. On the other hand, the one great advantage in seamless hose is its style appeal due to the absence of any seam or other markings to detract from the contour of the leg and hence it would not be desirable to sacrifice the fugitivity of the guide line for the benefit such a line might give in guaranteeing accurate final boarding. This final boarding cannot be eliminated, as the nylon stocking comes from the dye bath in a wrinkled condition and only by placing the stocking on a metal form in an atmosphere of heat, can these wrinkles be removed and the fabric smoothed so that the stocking will have an attractive appearance on the sales counter. However, the lack of a guiding line makes practically impossible the consistently proper placement of stockings on the forms in such a manner that the crease inserted in the front and back edge of the stocking by pre-boarding, will come exactly on the front and back edge of the final boarding form. Regardless of the care taken, the final boarding operator can only guess whether or not the stocking is on the final board exactly as it was pre-boarded, and usually if one part of the stocking is on the form correctly another portion is incorrectly placed. The result is that when the stocking is removed from the final boarding form any inaccuracy in final boarding will be evident in the appearance of a double crease, plus—in certain cases—a bad wrinkling diagonally across the ankle or foot or even across the upper portion of the leg, due to the stocking having been placed on the final form in what amounts to a twisted or spiral condition as compared with the manner in which the stocking was pre-boarded. Such hose must be final boarded over again in the hope of getting better results. It will thus be seen that shaping operations subsequent to dyeing or washing of nylon hose have been carried out by the old methods of the past so that many unique advantages to be found in the molding qualities of thermoplastic fiber have been lost due to the inability of the boarding art to meet the needs of nylon and like products for accurate finished shaping. It must not be overlooked that in the molding of thermoplastic materials for items of wear or for household use—such as curtains, draperies, upholstery, or other purposes where molding is an initial or intermediate step in the shaping of the finished product, color marks for guide purposes in molding must be of a special chemical character that will not permit the color to fasten permanently on the plastic in the heat of the molding operation. Where the article is passed through a dye bath, rinse bath, or other bath, the color guide will in many cases disappear—intentionally in certain instances. The completion of many textile and other articles will depend upon final tailoring which may or may not contribute to the overall shape of the finished product and such tailoring cannot be accurately accomplished without definite knowledge as to the precise locations of the colored guide or guides that have disappeared—coincidentally or otherwise—between the molding and final shaping on account of dyeing, washing, or other treatment, whatever its character.

With the foregoing and other considerations in view, the present invention contemplates the provision of shapable fabrics with guide lines which are substantially invisible under ordinary conditions, as under ordinary light and temperature conditions, but which become visible under special conditions which can be made to obtain during a shaping operation. For example, the guide lines may be composed of an ink or dye which will be substantially invisible under ordinary conditions but which will be rendered visible under extraordinary conditions as when special radiation is applied thereto; for example, heat or other infra-red rays or ultra-violet rays. In general substances which are responsive to extraordinary vibratory conditions are adapted for use in accordance with the invention. More specifically there may be employed substances which change color or brilliancy under the influence of heat, or of an invisible band of the spectrum as, for instance, the ultra-violet rays commonly emitted by "black light" lamps. Examples of such substances are the various fluorescent cloth dyes such as employed for laundry marking (and various other purposes).

In accordance with the invention in its broader aspects, such lines may be used to mark the central back or central front line of a stocking or both, to outline and center the bulges in a brassière or other form fitting undergarments which ordinarily requires further tailoring, or to serve as guide lines for a variety of like purposes. In carrying out the invention the guide lines may be marked with an ink containing non-fugitive material which is substantially invisible in ordinary light but which is fluorescent under light of bands which may be readily directed thereon as by an ordinary "black light" lamp. Generally speaking such fluorescent ink or dye must have the quality of withstanding the heat of the molding operation and the dyeing and washing routines characteristic in the handling of nylon and other thermoplastic materials of which stockings and other articles of apparel are composed, without losing the degree of fluorescence necessary for luminescence under "black light."

The invention accordingly comprises the several steps and the relation and order of one or more such steps with respect to each of the others, and the article possessing the features, properties, and the relation of elements, which are exemplified in the following detailed disclosure, and the scope of the application of which will be indicated in the claims.

For a fuller understanding of the nature and objects of the invention, reference should be had to the following detailed description taken in connection with the accompanying drawings, in which:

Figure 1 is a perspective side view of a seamless knitted nylon stocking embodying the invention;

Fig. 2 is a similar view of the same stocking under the light from a "black light" lamp;

Fig. 3 is a similar view showing a stocking having additional guide lines;

Fig. 4 illustrates a boarding operation;

Fig. 5 shows the sequence of steps in preparing and shaping an article in accordance with the invention; and Fig. 6 is a perspective front view of a brassière embodying the invention.

As will be seen from Fig. 1 the stocking 10 is seamless and has no apparent guide line for a shaping operation. It has however been subjected to a preparatory treatment with non-fugitive fluorescent ink of a character, for example, such as hereinafter described to provide a guide line such as will be seen at 11 in Fig. 2 under the rays of a "black light" lamp 12. The guide line, which appears at the center rear of the stocking under the lamp 12, may be applied in any of a variety of ways, as by ordinary painting or marking or through the medium of a suitable knitting instrumentality as in the manner in which the lines of said Patent No. 2,388,648 is applied.

While the guide line 11 runs only from the top band 13 to the heel pocket 14' of the stocking 10, other or longer guide lines may be applied pursuant to the invention to increase still further the accuracy of the shaping operation. In Fig. 3 there is shown under a lamp 12 a stocking 10a having a guide line 11a which extends slightly to one side of the center of the back of the stocking from the top of the stocking to the heel pocket, and a guide line 15 running along the bottom of the foot from the heel pocket to the toe pocket 16, and disposed at the same side of the center, and a line 17 running down the front slightly at the same side of the center.

While the guiding line or lines may be applied to the stocking to come on the exact edge or thickness of the molding or boarding form which is usually flat, they are preferably applied, as shown, sufficiently off-center so that the guiding line or lines come along the board's edge, paralleling the form's profile on one or more edges to the heel insert of the stocking 10. Other or longer guide lines may be applied for use as shown in Fig. 3.

Pursuant to the invention, the operator is enabled to accurately guage the proper position of the stocking when it is on the form. As shown in Fig. 4, the operator may stand at one side of the form and with a minimum of effort and a maximum of accuracy slip the stocking over the form in exactly the position it should be in, in order to be properly shaped. Fig. 4 shows an ordinary final boarding device; preboarding devices being generally similar. It will be appreciated, however, that the invention does not concern itself with any particular type of shaping apparatus.

In the particular form of apparatus shown in Fig. 4 there are provided rows of shaped forms 18, each pivotally mounted on a stand 19. While the stockings are being put on the form 18 a "black light" lamp 12 is turned on so that lines 11a, 15, and 17 will be visible to the operator. The lamp may thereupon be turned off or moved so as to be used in connection with another boarding unit in repeating the step already shown in Fig. 4. Normal lighting may be reduced as necessary depending on the brilliancy of the particular fluorescent used, and the strength of the non-visible radiation employed.

In a typical operation the stockings are knit, as on an ordinary circular knitting machine. Before, during, or after the knitting, lines such as 11, 11a, 15 and 17 are applied at desirable positions on the stocking. According to customary present-day methods of manufacturing hose, this marking would preferably be done by a knitting instrumentality such, for example, as a needle as in the above mentioned Patent No. 2,388,648, a sinker, a special instrumentality governed by selectable jacks, or the like. However, the guide marks could be applied by a suitable brush, pen, or pencil after knitting, weaving, or any other type of fabrication. In the case of a molded stocking produced from sheet or liquid plastic on a sculptured or other type of shaped form, the guiding marks could be applied by a stamping operation or as an integral part of the molding operation. In stocking manufacture, after fabrication — as by knitting — and after the toe is closed by looping, it is now customary to conduct a preboarding operation on a device such, for instance, as shown in Fig. 4. After the stockings have been placed accurately straight on the metal forms, the hose are subjected in this condition to a heat treatment consisting of a steam bath at approximately 240° F. or higher for one minute or longer according to the temperature of the steam, for example, if nylon is the thermoplastic material of which the stockings are composed and which it is desired to mold by setting. Guide lines or marks similar in purpose to those shown at 11, 11a, 15, and 17, in Figs. 2 and 3, could be inserted in a warp knit fabric by running a warp yarn thru a suitable solution containing material which will fluoresce under a particular light but will be substantially invisible otherwise. Such a solution may be applied by dipping the yarn and knitting or weaving it in — or may be applied to the final product as by a brush, pen, or pencil after knitting, weaving or other fabricating operation.

The preboarding step definitely fixes the shape of the knitted loops and, as the stocking fabric is made up entirely of said loops, fixes the shape of the stocking itself. In addition, in the case of nylon, the heat treatment causes the yarn to contract slightly and hence the stocking fabric is shrunk just enough to insure the fabric hugging the metal form — when the hose is properly knit — so that the stocking shape will be consistent with the profile of the preboarding form itself. The fabric tension brought about by the shrinkage helps to make a clearer and more uniform stitch and to overcome defects in knitting.

After preboarding the stockings are ready for scouring and dyeing and are ordinarily placed in a liquid bath which is usually heated briefly to 212° F. approximately, or less, for the scouring treatment, and then rinsed and the moisture extracted. The stockings are dyed in a second bath at a temperature of approximately 190°–200° F. for one or more hours. Directly after or during dyeing, the stockings are given a "finishing" treatment of chemicals for spot proofing, improving the handling qualities, and to insure the fabric having sufficient crispness and stiffness to lie perfectly flat after final boarding. Then, the hose are subjected to an extracting treatment to remove the surplus moisture and, in damp condition, are ready for final boarding. Contrary to the results when the guide lines consist of a fugitive dye, the permanent invisible dye guide line remains on the stocking and shows up clearly under "black light" when it is placed on the final boarding forms so that extreme accuracy of positioning which is exactly in keeping with the preboarded positioning can be obtained with the utmost ease. The final boarding is ordinarily performed on internally steam heated forms at approximately 220° F. or on flat solid metal forms which are subjected to a flow of hot air usually of a somewhat lower temperature.

In Fig. 6 there is shown a portion of a brassière embodying the invention. The body 25 of each side of the brassière is formed of knitted or woven nylon, rayon, or other thermoplastic material or of thermoplastic sheeting which has been rolled, extruded, or otherwise formed. This body 25, however, formed, is provided with centering indicia 26 and surrounding guide lines 27 or with one or more of these or similar guide markings which will assist or will have assisted in the shaping of the article. These indicia may be formed of dyes which are invisible under ordinary conditions but visible under controlled radiation — as, for instance, fluorescent inks — with or without other types of inks or dyes, as herein indicated. An example of a dye which can be effectively used with a fluorescent ink is a fugitive ink which is visible under normal light.

While the details of the process may be varied widely, the method basically involves the steps of applying guide lines in invisible ink and carrying out a step in a shaping operation under special conditions which render the invisible ink visible. This step is ordinarily the placing of the article upon a form on which it is to be shaped, but in accordance with the invention in its broader aspects the step may involve a manual shaping by the operator while the guide lines are illumined by the special lamp. In the treatment of hosiery, as in the shaping of nylon hose, a typical operation may comprise, as indicated in Fig. 5, a step 20 of applying the guide lines to the hose, a preboarding step 21, a dyeing step 22, and a final boarding step 23. The employment of a fluorescent guide line on hose or other knitted fabrics is, of course, advantageous in a wide variety of types of shaping procedures. An example is the "Dunn process" in which the pre-boarding step is eliminated by combining pre-boarding and final boarding into a single operation directly after dyeing.

The fully shaped stockings are then ready for sale or use since the guide lines are either completely invisible or so nearly invisible that they will make no difference in the appearance of the stocking to the ordinary observer. There may be used a dye or ink which will disappear little by little as the article is subjected to successive washings or there may be used a permanent dye or ink which will enable the article to be sent, as to a dying establishment or laundry, from time to time to be reshaped to eliminate any bulges, stretchings, wrinkles, or other distortions which the article acquires in use.

While a "black light" lamp may be used for both the preboarding and final boarding operations in the standard procedure for stockings of thermoplastic yarn, the present invention in certain of its more specific aspects contemplates the provision of guide lines which will serve without a lamp for the preboarding operation. Such guide lines may be effectively obtained by combining a fugitive dye with a fluorescent organic ink. Guide lines containing the combined marking fluid can be used for preboarding without any special lighting facilities, but after the fugitive dye has been removed in the scouring or dyeing operation, the fluorescent organic dye will remain as a guide in placing the stockings on the final boarding forms.

There may be employed any fugitive ink compatible with the fabric and with the fluorescent dye and other materials used and which will not be fixed by the fluorescent dye, or by the desired conditions of treatment, the heat of the molding or preboarding operation, or other treatment.

Any of a wide variety of invisible inks or dyes may be employed, in accordance with the invention, the primary requirement being that the ink or dye be substantially invisible in normal lights. There may be used, for instance, various of the materials of the types used in laundry-marking, as set forth in the Sell Patent 2,267,758 and in the De Fraine et al. Patent 2,180,508. A highly satisfactory nylon-fast invisible ink is 7-hydroxy, 4-methyl coumarin. Any of a number of suitable vehicles, such for example as those disclosed in said Sell patent, may be used. It may be readily combined in any desired proportions with fugitive tints such as malachite green (color index No. 657), auramine O (color index No. 655), and various of the others which are well known in the art of preboarding. A desirable fugitive ink solution that can be washed or scoured from nylon fabric even after a heat treatment such as involved in pre-boarding may be formed by adding approximately 5 to 10 parts by weight of malachite green to approximately 60 parts by weight of isopropyl alcohol and approximately 40 parts by weight of dibutyl phthalate. When a fugitive yellow tint is desired auramine O may be substituted for the malachite green.

Thus, guide lines adapted for use both in preboarding without special radiation and for final boarding under the rays of an ultra-violet lamp may be readily and effectively applied.

When a fugitive dye and a fluorescent dye or the like are used together, they may be applied together or successively and may either or both be applied as continuous or broken lines as may best suit the requirements for a particular case. The conjoint use of a fugitive marking medium and a marking medium responsive to special radiation is advantageous in a wide variety of operations in the formation of shaped articles as, for instance, when a tailoring or partial-molding operation is employed either as a substitute for or in advance of a preliminary operation such as preboarding.

As will be understood, the terms "fluorescent dye" and the like are used herein to define materials which are fluorescent under special light bands (e. g. ultra-violet) which are not ordinarily present in quantities sufficient to cause fluorescence.

There are various procedures for the shaping of nylon and other thermoplastic hose which do not employ a preboarding operation. In certain of these, the scouring and tinting operation is conducted before any shaping. In such operations, the use of a fugitive tint by itself would be undesirable and ineffective, whereas the present invention provides a complete solution to the problem of accuracy in the shaping. Inasmuch as the shaping is conducted in a single operation, the necessity for accuracy is even greater than when there has been a preboarding. Similar considerations apply in the shaping of brassières, girdles, and other articles in a single operation and in the shaping of thermoplastic sheet material into shaped articles where the shaping requirements cannot otherwise be met except by highly-inefficient and costly tailoring operations.

Since certain changes in carrying out the above method, and certain modifications in the article which embody the invention may be made without departing from its scope, it is intended that all matter contained in the above description or shown in the accompanying drawing shall be interpreted as illustrative and not in a limiting sense.

I claim:

1. A shaped article of apparel having a contour comprising a guide marking in accordance with which the article was shaped, said guide marking comprising non-fugitive fluorescent material defining the contour of the article along a shaped portion thereof and being substantially invisible under ordinary conditions but visible under controlled radiation.

2. A shapable article of apparel to be formed with a contoured portion comprising a guide marking outlining at least in part the contour of the contoured portion of the article to be shaped and comprising non-fugitive fluorescent material which is substantially invisible under ordinary conditions but visible under controlled radiation.

3. Contoured seamless hose having at a contoured portion thereof, a guide marking corresponding to a portion of a shaping form and comprising non-fugitive fluorescent material adapted to be rendered visible by a special light so as to be employed in centering the hose on a shaping form.

4. An article of manufacture embodying thermoplastic sheet material to be formed with a contoured portion comprising a guide marking defining the contour of the contoured portion when properly in place on a shaping form, said guide marking comprising non-fugitive fluorescent material which is substantially invisible in ordinary light but visible in a special light.

5. A foundation garment having a contour and comprising a guide marking defining the contour of the foundation garment when properly in place on a form, said guide marking comprising non-fugitive fluorescent material which is substantially invisible in ordinary light but visible in a special light.

6. Contoured seamless hosiery having a guide line down the back thereto substantially defining the center of the back, said guide marking corresponding substantially to the contour of the back of a boarding form and being composed of a non-fugitive fluorescent material which is substantially invisible in ordinary light but visible under special radiation with reduced visible illumination.

7. Seamless hose having shaping guides thereon slightly offset from the center front and from the center rear respectively so as to lie on the same side of the hose, said guides comprising a non-fugitive fluorescent material which is substantially invisible in ordinary light but visible in a special light.

8. The method of making hose having a contour which comprises providing the hose with composite markings following the contour of the hose and including fugitive ink and non-fugitive ink which is substantially invisible under ordinary light but which may be rendered visible under special light, preboarding the hose under normal light using the fugitive ink, dyeing the hose eliminating the fugitive ink, and final-boarding the hose under said special light using the non-fugitive ink.

9. A shapable article of apparel to be formed with a contoured portion comprising a guide marking outlining at least in part the contour of the contoured portion of the shaped article, said guide marking comprising in part a non-fugitive substance which is substantially invisible under ordinary light but visible under special light and in part a fugitive substance which is visible under ordinary light.

10. An article of apparel having a contour and composed of thermoplastic material comprising a guide marking defining the contour of a contoured article of apparel when properly in place on a shaping form, said guide marking comprising in part a non-fugitive fluorescent substance which is substantially invisible under ordinary light but visible under special light and in part a substance which is visible under ordinary light but removable in a bath.

11. Contoured hosiery comprising guide lines defining the contour thereof when properly in place on a form, said guide lines comprising in part a non-fugitive substance substantially invisible under ordinary light but visible under special light and in part a substance visible under ordinary light but substantially removable in a bath, each of said parts having at least sufficient continuity to serve as a guide means without the other.

LAWRENCE W. GOTTSCHALCK.

REFERENCES CITED

The following references are of record in the file of this patent:

UNITED STATES PATENTS

| Number | Name | Date |
| --- | --- | --- |
| 2,157,119 | Miles | May 9, 1939 |
| 2,190,807 | Steinberger | Feb. 20, 1940 |
| 2,333,329 | Miglarese | Nov. 2, 1943 |
| 2,388,648 | Sheppard | Nov. 6, 1945 |